8597X
J. IGGETT.
Portable Cooking Stove.
Patented Jan'y 16, 1835.
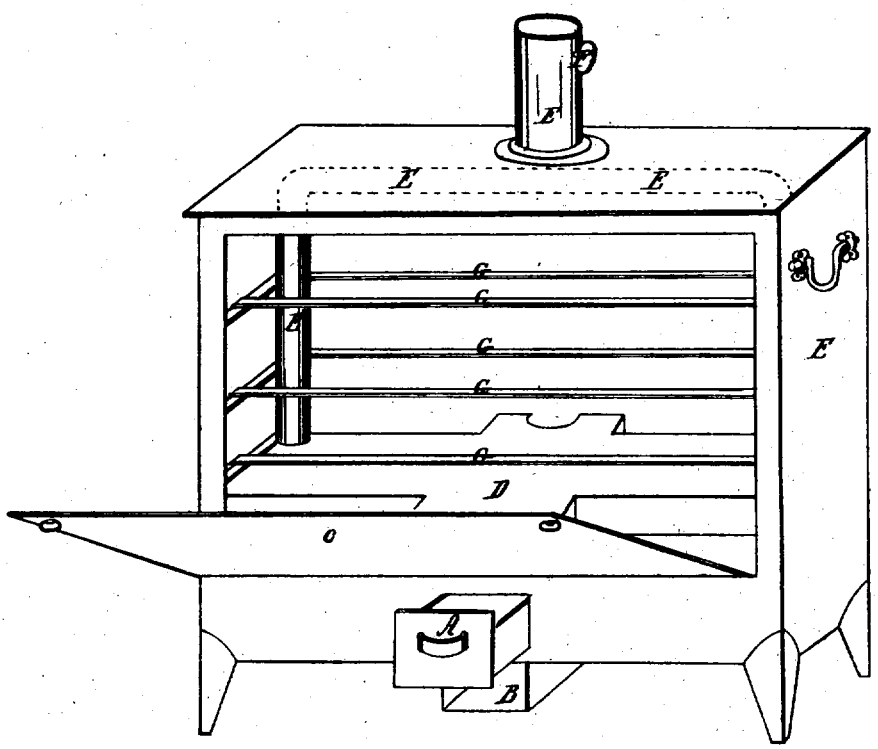

Jan. 16. 1835 8597X

John Iggett, of Albany, N. York.
Letters Patent

The schedule referred to in these Letters Patent and making par of the
same, containing a description in the words of the said John Iggett, himself
of his improvement in a portable Cooking Stove.

---

To all to whom these presents shall come: John Iggett, Tin & Sheet
iron worker, of the City and County of Albany & State of New York
sends Greeting: Be it known that I the said John Iggett, have made
invented, constructed and applied to use a new and useful method of
heating an oven, stove, and heaters for cullinary and other purposes
and called by me the portable stove and cullinary heater: and may
be constructed as follows: the stove and heater of the medium size is
twenty-seven inches long, fifteen inches wide, and twenty inches high,
with a large door or folding doors upon the front or back commu-
-nicating with the oven, with one or more tiers of horizontal bars,
or beams, for placing the article to be cooked baked or roasted upon -
the sides, ends, and top to be made of tin or sheet or cast iron or
any other suitable metalic substance lined with tin, the bottom to
be of cast or sheet iron or tin, the horizontal bars or beams are
placed at such distances apart in the oven, as will best accommo-
-date the article to be cooked, the beams are supported at either side
by strips fastened to the ends of the oven: the fire is applied in the
centre, at the bottom of the oven, by means of a moveable sliding
cast or sheet iron box grate, of square or round form, and is retain-
-ed in its place by means of grooves or supports made of iron or other
metalic substances, under or upon the bottom plate of the oven, the
grate must vary in size to suit the stove, or heater for which it is
intended; directly over the grate is placed an inverted basin or
heater, of square or round form projectingup into the oven two or
more inches, and is riveted and secured to the bottom plate of
the oven; from each side of the heater, a sheet iron or cast iron

7597X heat, or conducting pipe projects, extending along and a little above the bottom plate, to within an inch of the end of the oven, thence perpendicular along the ends of the oven, to within an inch of the top plate, thence horizontally again a little below the bottom of the top plate to the centre, where the two pipes intersect and are connected by a larger pipe, which conveys off the smoke and steam from the grate - a damper may be placed in the larger and small pipes - I, the said John Iggett also claim the invention of making the above described stove in every respect similar except that the heat and smoke conductors may extend directly out of the top at each end of the stove: and I the said John Iggett, claim as my invention, the making & constructing the portable stove & cullinary heater similar in all respects to the one first described, excepting the grate & heater, which I will vary by introducing a moveable heater & grate of a square or round form made larger at the top than at the bottom, projecting two or more inches up into the oven and three or more inches below the bottom of the oven. the box or sliding grate rests upon the ribs in the lower part of the heater leaving a space below the grate in the box sufficiently large to contain the ashes, with a damper at one or both ends the top of the heater to be so constructed, if required, as to be taken off to receive a griddle, gridiron, boilers, or other articles to be heated by coming in contact directly with the fire in the grate -

And I the said John Iggett claim as my further invention, the making and constructing the portable stove and cullinary heater, in all respects, similar to those heretofore described, excepting that I will divide the oven of the stove into two or more separate and distinct, and separate departments, so that various kinds of of cooking and heating may be performed at one and the same time. And I, the said John Iggett, do claim as my further invention of making and constructing the portable stove & cullinary heater, in all respects similar to the former, excepting that I will make the stove round or oval, and introduce , instead of the bars, or beams, a rotary shaft standing upon the centre of the heater, and extending to the top of the oven upon which said rotary shaft I will place shelves for supporting any articles to be cooked or heated, the shelves to be placed at suitable distances apart upon the shaft by means of pins going through the shaft 8597X 239 nd directly under the shelves, and may be lowered or elevated at will.
id rotary shaft and shelves may be taken out and replaced as required —
And I the said John Iggett do claim as my further invention, the making
nd constructing the said portable stove & cullinary heater similar in all
espects to the one first described, excepting I will make the sides of the box
rate concave, in order to allow the heat to ascend between the outside of
he grate and the inside of the lower projections of the heater, and also of construct-
ing an outside casing at the outside of the lower part of the heater, leaving a
pace between the heater and the casing, communicating with the heater and
conducting pipes, inside of the oven, or with the oven directly —
And the said John Iggett, further claims the application of the inverted basin
or heater, box grate, heat & conducting pipes rotary shaft & shelves, moveable top
upon the heater, the division of the oven into different apartments, and all
and singular, the various modes of constructing the same, herein before described —
either with a round, square, oval, oblong, any & every shaped box or stove,
heater, tank, vessel of any, and every description, whereby the operation & action
of the heat is the same as herein before described — —
In testimony that the above is a true specification of my said invention or
discovery, as above described, I have hereunto set my hand this eight day of
December in the year eighteen hundred and thirty-four. 19.

Witnesses
Gerrit L. Dox
R. E. Ward

John Iggett

Exd.
[illegible]

1092 words.

(Patented [illegible] 1835)

(Drawing)